United States Patent Office 3,752,769
Patented Aug. 14, 1973

3,752,769
STABLE SOLUTIONS CONTAINING MOLYBDE-NUM-99 AND PROCESS OF PREPARING SAME
Robert E. Lewis, Pleasanton, and Joseph I. Tenorio, Niles, Calif., assignors to General Electric Company
No Drawing. Filed Mar. 4, 1971, Ser. No. 121,183
Int. Cl. A61k 27/04
U.S. Cl. 252—301.1 R     8 Claims

ABSTRACT OF THE DISCLOSURE

A method of preparing a stable solution containing molybdenum 99 is presented in which the starting material of molybdenum trioxide containing the molybdenum-99 isotope is dissolved in a sufficient amount of an aqueous ammonium hydroxide to give an ammonium molybdate solution having a pH in the range of about 7.5 to about 9.5. The solution is then filtered to remove any suspended solids, and from about 0.12 to about 0.60 weight percent of sodium hypochlorite in the form of an aqueous solution is added to the ammonium molybdate solution. This process gives a stable ammonium molybdate solution with a pH in the range of about 7.5 to about 9.5 comprising from about 0.12 to about 0.60 weight percent sodium hypochlorite, up to about 0.46 gram of ammonium molybdate per milliliter of solution and the balance water. The stable ammonium molybdate solution remains water-clear and free of discoloration from radiolytic reduction of molybdenum for the usual life of the solution.

BACKGROUND OF THE INVENTION

Technetium-99m is an extremely useful tool for medical applications and diagnosis. This radioisotope is used in a variety of applications in medical diagnosis. It is well suited for brain, thyroid, liver, lung blood pool and tumor scanning, and is preferred over other radioisotopes because of the selective uptake by specific organs, its short half-life and low radiation dose rate which reduces the exposure of the patient. In addition, technetium-99m can also be used in industrial applications, such as measurement of flow rates, process control and the like.

Since the radioisotope technetium-99m has a short half-life (6 hours), it is common practice to use a molybdenum-99-technetium-99m generator as a supply of the technetium-99m. Basically, a generator is made by sorbing the molybdenum-99 parent radioisotope having a 66-hour half-life on an anion exchange material, such as alumina. Subsequent decay of the 66-hour molybdenum-99 produces 6-hour technetium-99m which can be selectively separated from the molybdenum-99 parent by elution with a saline solution or other solvent. The users then extract the technetium-99m from the generator as their needs require.

One of the complicating factors in the manufacture of the molybdenum-99-technetium-99m generator is the chemical instability of the molybdenum-99 solution used in preparing the generators. The present procedure for preparing ammonium molybdate solutions is to dissolve molybdenum trioxide in concentrated ammonium hydroxide to yield ammonium molybdate in a basic ammoniacal solution at a pH of 11 or higher. At the time of shipping to the generator manufacturer, sodium hypochlorite solution is added as a holding oxidant. The solution remains clear and colorless for about 8 hours, but discolors due to the production of radiolytic hydrogen which reduces the molybdenum from the +6 valence state (molybdate) to lower valence states. These lower valence states form dark colored insoluble compounds and will not sorb on the alumina during generator manufacture. The discolored solutions must be reoxidized by the generator manufacturer before quality radioisotope generators can be prepared from the ammonium molybdate solutions.

It is also desirable to have an ammonium molybdate solution of high concentration for shipping purposes to hold shipping volume to a minimum. This will allow savings in shipping costs because smaller shipping casks can be used for transporting the molybdenum-99 solution to the generator manufacturers.

From the foregoing it has remained desirable to have an ammonium molybdate solution of high concentration which remains free of discoloration for the life of the product.

SUMMARY OF THE INVENTION

The foregoing disadvantages of the ammonium molybdate solutions employed in generator manufacture are eliminated by a process employing control of the pH of the ammonium molybdate solution. This control of the pH is achieved by dissolving molybdenum trioxide in a sufficient amount of aqueous ammonium hydroxide to give a solution with a pH in the range from about 7.5 to about 9.5, and can be used to give varying concentrations of ammonium molybdate in the solution from very dilute concentrations up to about the maximum solubility of this salt in water. The solution is filtered to remove suspended solids and from about 0.12 to about 0.60 weight percent of sodium hypochlorite is added to the solution. The practice of this process gives a stable aqueous solution having up to about 0.46 g. of ammonium molybdate per milliliter, about 0.12 to about 0.60 weight percent sodium hypochlorite and a pH in the range of about 7.5 to about 9.5.

Accordingly it is an object of this invention to provide a stable ammonium molybdate solution which is free of discoloration from radiolytic reduction of molybdenum for the useful life of the solution.

A further object of this invention is to provide economics in shipping by increasing the concentration of molybdenum-99 in aqueous solutions of ammonium molybdate used in generators for technetium-99m.

Another object of this invention is to provide an ammonium molybdate solution having a pH colse to neutral for stability of the solution against radiolytic reduction of the molybdenum ions and for handling convenience enabling column loading in techetium-99m generators.

Still another object of this invention is to provide a method of rapidly making ammonium molybdate solutions for technetium-99m generators.

Other objects and advantages of this invention will be apparent to a person having ordinary skill in the art from a reading of the following specification and the appended claims.

DETAILED DESCRIPTION OF THE INVENTION

The practice of the process of this invention achieves a novel ammonium molybdate solution having a high concentration of molybdenum-99 remaining water-clear during the useful life of the solution, usually a period of about 21 days. The steps of the process of preparing the stable ammonium molybdate solutions will be discussed in detail in the sequence in which they are practiced.

The first step has molybdenum trioxide in powder form, preferably about 200 to about 400 mesh, dissolved in sufficient quantities of dilute aqueous ammonium hydroxide at room temperature to give an ammonium molybdate solution having a pH in the range of about 7.5 to about 9.5, preferably about 8.5 to about 9.5. It is preferred to add the molybdenum trioxide powder to a solution of the base for better dissolving of the solid and avoiding formation of ammonium paramolybdate crystals in the solution. It is also preferable to use stirring or circulation of the base solution to enable efficient contact between the powder and the solution. The dilute aqueous base solution of ammonium hydroxide has a concentration in the range of about 40 to about 45 percent ammonium hydroxide by weight and preferably about 42 percent by weight ammonium hydroxide. In this manner about 2.5 to about 3.0 milliliters, preferably about 2.6 milliliters, of base solution per gram of molybdenum trioxide are employed. The room temperature condition for purposes of this dissolution step is defined as about 20° C. to about 25° C.

The use of the dilute ammonium hydroxide is important to the practice of this process and enables a clear distinction in the final pH of the stable ammonium molybdate solutions of this invention (about 7.5 to about 9.5) when compared with the prior art practice (11.0 or greater). At a pH above about 9.5, the solutions are not stable to discoloration and it is postulated that the excess ammonium hydroxide reacts with the sodium hypochlorite. This allows the radiolytic hydrogen to reduce the ammonium molybdate to insoluble lower valence states of molybdenum. At a pH below about 7.5, the solutions form ammonium paramolybdate crystals which are less soluble than ammonium molybdate.

It has been observed that the use of dilute ammonium hydroxide results in dissolving a higher amount of molybdenum trioxide per unit of base so that the final concentration of the ammonium molybdate salt in the solution can be near the maximum solubility of this salt in water at 25° C. if desired. Concentrations greater than about 0.46 gram per milliliter of ammonium molybdate may crystallize out ammonium molybdate which is undesirable. The solution of this invention has the striking advantage that shipping volume of the product having the same amount of radioactivity will be lower, resulting in the use of smaller shipping casks and reduced shipping costs. Of course, solutions having lower concentrations of this salt (e.g., about 0.02 to about 0.46 gram per milliliter) can be achieved when desired either by dilution with water or initially dissolving less molybdenum trioxide. It has also been observed that the use of dilute ammonium hydroxide enables a more rapid rate of dissolution of the molybdenum trioxide than is achieved with concentrated ammonium hydroxide solutions. This involves shorter time for processing resulting in reduced labor cost and more efficient equipment use. It is also felt that elimination of excess base from this dissolution step reduces the incidence of reaction between the base and the holding oxidant medium of sodium hypochlorite.

The next step is removing any suspended solid particles such as unreacted molybdenum trioxide particles from the ammonium molybdate solution. Any representative process removing suspended particles can be used, and it is preferred to use filtration. Any method of filtering can be used which achieves removal of particles from the solution with a vacuum suction method being representative. One particular filter medium is a polycarbonate polymeric membrane filter having openings in the range of about 0.30 to about 10.00 microns, preferably about 0.45 micron.

The last step of the process is stabilizing the solution with a holding oxidant of sodium hypochlorite. In practice, about 0.12 to about 0.60 weight percent of sodium hypochlorite is added as an aqueous solution and mixed into the ammonium molybdate solution. The sodium hypochlorite prevents reduction of the molybdate ions in the solution to lower valences by radiolysis which in turn results in precipitation of solids and a blue discoloration of the solution. The sodium hypochlorite is preferably added as a 6 percent aqueous solution. Less than about 0.12 weight percent sodium hypochlorite is not sufficient to maintain a colorless product for the life of the solution and more than about 0.60 weight percent sodium hypochlorite is not needed and may interfere with the manufacture of the generators.

The product of this process is a stable aqueous ammonium molybdate having a pH in the range of about 7.5 to about 9.5, an ammonium molybdate concentration up to about 0.46 gram per milliliter and a sodium hypochlorite concentration of about 0.12 to about 0.60 weight percent. These solutions are stable as there is no radiolysis reaction reducing the molybdenum ions to give precipitation of these ions and a blue discoloration to the solution. Further, this solution enables a reduction in the leakage of molybdenum-99 during loading and use of the generators. The water-clear, stable solutions of this invention do not require adjustment of the oxidation state of the molybdenum ions prior to preparation of molybdenum-99-technetium-99m generators and the solutions are easily adjusted to the end user's desired pH because there is no variable amount of ammonium hydroxide present to be neutralized.

Those skilled in the art will gain a further understanding of this invention from the following illustrative, but not limiting, examples of the invention.

EXAMPLE 1

Two solutions were prepared with the first, Solution A, being representative of the prior art and the second, Solution B, being made according to the practice of this invention.

Solution A.—31 grams of molybdenum trioxide containing 154 curies of molybdenum-99 were dissolved in 100 milliliters of concentrated ammonium hydroxide (28.5% $NH_3$). Later 1 milliliter of sodium hypochlorite per 7.5 curies of molybdenum-99 and a volume of water equal to one-half the volume of product were added to the solution. The pH of the solution was 11. The concentration of molybdenum-99 was 0.9 curie/milliliter in the shipping solution.

Solution B.—38 grams of molybdenum trioxide containing 200 curies of molybdenum-99 were dissolved in 100 milliliters of a solution containing 42 milliliters of bottle ammonia (29.0% $NH_3$) and 58 milliliters of distilled water. The solution was filtered through a polycarbonate polymeric membrane filter having openings of about .45 micron. Ten milliliters of 6% by weight sodium hypochlorite were added as a holding oxidant. The pH of the solution was 9.0. The concentration of molybdenum-99 was 1.72 curies/milliliter in the shipping solution.

EXAMPLE 2

The solutions of Example 1 were held in clear plastic jars and observed daily for discoloration. Solution A showed evidence of discoloration after one day due to reduction of the molybdenum-IV ions by radiolysis hydrogen. After 21 days Solution B was still clear and free of discoloration.

EXAMPLE 3

An experimental lot of 50 grams of irradiated molybdenum trioxide was ground to 200–400 mesh and dissolved in 130 milliliters of dilute ammonium hydroxide. The dilute ammonium hydroxide contained 42 percent bottle ammonium hydroxide and 58 percent distilled water. The solution contains 250 curies of molybdenum-99 at the time of dissolution. Ten milliliters of 6% sodium hypochlorite were added to 100 milliliters of the molybdenum solution. After 21 days there was no color formation or precipitation of molybdenum.

As will be apparent to those skilled in the art, various modifications and changes may be made in the method and product described herein. It is accordingly the intention that the invention be construed in the broadest manner within the spirit and scope as set forh in the accompanying claims.

What is claimed is:

1. A method of making a stable solution containing molybdenum-99 from molybdenum trioxide comprising the steps of
    (a) reacting from about 2.5 to about 3.0 milliliters of about 40 to about 45 percent by weight of an aqueous ammonium hydroxide solution per gram of molybdenum trioxide to give an ammonium molybdate solution having a pH in the range of about 7.5 to about 9.5, (b) filtering the ammonium molybdate solution to remove suspended solids, and (c) adding from about 0.12 to about 0.60 weight percent of sodium hypochlorite to the ammonium molybdate solution.

2. The method according to claim 1 in which the pH of the solution is about 8.5 to about 9.5.

3. The method according to claim 1 in which about 0.60 weight percent of sodium hypochlorite is added to the solution.

4. The method according to claim 1 in which the solution contains from about 0.02 to about 0.46 gram per milliliter of ammonium molybdate.

5. A stable ammonium molybdate solution comprising from about 0.02 to about 0.46 gram per milliliter of ammonium molybdate wherein the molybdate contains molybdenum-99 and from about 0.12 to about 0.60 weight percent sodium hypochlorite with the balance being water, the solution having a pH in the range of about 7.5 to about 9.5.

6. The solution according to claim 5 in which the pH of the solution is about 8.5 to 9.5.

7. The solution according to claim 5 in which the sodium hypochlorite is about 0.60 weight percent.

8. The solution according to claim 5 in which the ammonium molybdate is about 0.46 gram per milliliter.

References Cited

Cheng et al., Nuclear Science Abstracts, No. 13, vol. 23, July 1969, Item 24229 at p. 2462 (abstract from Ho Tsu H'o Hsueh, 6:97–104 October 1968).

BENJAMIN R. PADGETT, Primary Examiner

U.S. Cl. X.R.

424—1

UNITED STATES PATENT OFFICE
CERTIFICATE OF CORRECTION

Patent No. 3,752,769   Dated 14 August 1973

Inventor(s) R. E. Lewis et al

It is certified that error appears in the above-identified patent and that said Letters Patent are hereby corrected as shown below:

Column 1, line 25, "gram" should be --grams--. Column 1, line 29, "usual" should be --useful--. Column 1, line 37, "lung blood" should be --lung, blood--. Column 2, line 41, "colse" should be --close--. Column 3, line 28, "gram" should be --grams--. Column 3, line 35, "gram" should be --grams--. Column 3, line 56, "micron." should be --microns.-- Column 4, line 1, "gram" should be --grams--. Column 6, line 5, "about 8.5 to 9.5." should be --about 8.5 to about 9.5.--

Signed and sealed this 19th day of November 1974.

(SEAL)
Attest:

McCOY M. GIBSON JR.                C. MARSHALL DANN
Attesting Officer                  Commissioner of Patents